(12) United States Patent
Philipson et al.

(10) Patent No.: US 11,914,616 B1
(45) Date of Patent: Feb. 27, 2024

(54) SYSTEMS AND METHODS FOR CREATING A CONSISTENT BLOCKCHAIN INCLUDING BLOCK COMMITMENT DETERMINATIONS

(71) Applicant: Alchemy Insights, Inc., San Francisco, CA (US)

(72) Inventors: David Philipson, San Francisco, CA (US); Noam Hurwitz, San Francisco, CA (US); Omar Ceja, San Francisco, CA (US); Deepak Bansal, Round Rock, TX (US)

(73) Assignee: Alchemy Insights, Inc., San Francisco, CA (US)

( * ) Notice: Subject to any disclaimer, the term of this patent is extended or adjusted under 35 U.S.C. 154(b) by 0 days.

(21) Appl. No.: 18/083,421

(22) Filed: Dec. 16, 2022

(51) Int. Cl.
G06F 16/27 (2019.01)
H04L 67/12 (2022.01)

(52) U.S. Cl.
CPC .............. *G06F 16/27* (2019.01); *H04L 67/12* (2013.01)

(58) Field of Classification Search
CPC ...................................................... G06F 16/27
USPC ........................................................ 707/634
See application file for complete search history.

(56) References Cited

U.S. PATENT DOCUMENTS

| | | |
|---|---|---|
| 5,371,878 A | 12/1994 | Coker |
| 8,086,732 B1 | 12/2011 | Volz et al. |
| 8,554,929 B1 | 10/2013 | Szeto et al. |
| 9,613,120 B1 | 4/2017 | Kharatishvili et al. |
| 11,281,975 B1 | 3/2022 | Isaksson et al. |
| 11,728,976 B1 | 8/2023 | Godlove et al. |
| 11,750,711 B1 | 9/2023 | Philipson et al. |
| 11,769,143 B1 | 9/2023 | Godlove et al. |
| 11,811,955 B1 | 11/2023 | Hurwitz et al. |
| 11,816,021 B1 | 11/2023 | Ro et al. |
| 11,823,088 B1 | 11/2023 | Godlove et al. |

(Continued)

FOREIGN PATENT DOCUMENTS

| | | |
|---|---|---|
| CN | 109992993 A | 7/2019 |
| CN | 112150130 A | 12/2020 |

(Continued)

OTHER PUBLICATIONS

Koul, Rohan, "Blockchain Oriented Software Testing—Challenges and Approaches", IEEE, 2018 3rd International Conference for Convergence in Technology (I2CT), The Gateway Hotel, XION Complex, Wakad Road, Pune, India. Apr. 6-8, 2018, pp. 1-6.

(Continued)

*Primary Examiner* — Muluemebet Gurmu
(74) *Attorney, Agent, or Firm* — Carr & Ferrell LLP

(57) ABSTRACT

Systems and methods for creating a consistent blockchain including block commitment determinations are disclosed herein. An example method includes receiving a request for blockchain data from an application or a user, receiving proposed canonical heads from a plurality of blockchain nodes, receiving votes to determine a correct state for a consistent blockchain that includes a canonical head, the blockchain data being included in the consistent view of a blockchain, determining the canonical head based on the votes, determining a commitment level for at least one block in the consistent view of the blockchain, providing the consistent view of the blockchain to the application or the user, and exposing the commitment level for the at least one block.

30 Claims, 6 Drawing Sheets

(56) References Cited

U.S. PATENT DOCUMENTS

| | | |
|---|---|---|
| 2008/0098349 A1 | 4/2008 | Lin et al. |
| 2010/0293335 A1 | 11/2010 | Muthiah et al. |
| 2011/0078705 A1 | 3/2011 | Maclinovsky |
| 2011/0161488 A1 | 6/2011 | Anderson |
| 2012/0310878 A1 | 12/2012 | Vuksan et al. |
| 2016/0283348 A1 | 9/2016 | Golde et al. |
| 2017/0091069 A1 | 3/2017 | Fujiwara et al. |
| 2018/0089041 A1 | 3/2018 | Smith et al. |
| 2018/0145836 A1 | 5/2018 | Saur et al. |
| 2018/0198714 A1 | 7/2018 | Krieger |
| 2018/0300227 A1 | 10/2018 | Bergen |
| 2019/0171451 A1 | 6/2019 | Hardy et al. |
| 2019/0251018 A1 | 8/2019 | Jin et al. |
| 2020/0097953 A1 | 3/2020 | Islam et al. |
| 2020/0183818 A1 | 6/2020 | Guenther et al. |
| 2020/0233858 A1 | 7/2020 | Deng et al. |
| 2020/0286026 A1 | 9/2020 | Dahod et al. |
| 2020/0374113 A1* | 11/2020 | Noam ............... G06F 21/64 |
| 2020/0396065 A1* | 12/2020 | Gutierrez-Sheris ........................ H04L 67/104 |
| 2021/0067319 A1 | 3/2021 | Chung et al. |
| 2021/0097484 A1* | 4/2021 | Ramos ............... G06V 20/52 |
| 2021/0124730 A1* | 4/2021 | Kannan ............. G06F 16/125 |
| 2021/0201328 A1* | 7/2021 | Gunther ............ G06Q 20/322 |
| 2021/0240733 A1 | 8/2021 | Kramer et al. |
| 2021/0263719 A1 | 8/2021 | Pai et al. |
| 2021/0272075 A1 | 9/2021 | Adams et al. |
| 2021/0304205 A1 | 9/2021 | Saka et al. |
| 2021/0314154 A1 | 10/2021 | Husson et al. |
| 2022/0004539 A1 | 1/2022 | De Caro et al. |
| 2022/0027348 A1 | 1/2022 | Manevich et al. |
| 2022/0027970 A1 | 1/2022 | Kim et al. |
| 2022/0159069 A1* | 5/2022 | Shirley ............... H04L 67/568 713/157 |
| 2022/0173893 A1 | 6/2022 | Basu et al. |
| 2022/0318122 A1 | 10/2022 | Hughes et al. |
| 2022/0335049 A1 | 10/2022 | Hacigumus et al. |
| 2023/0098185 A1 | 3/2023 | Carver et al. |

FOREIGN PATENT DOCUMENTS

| | | |
|---|---|---|
| KR | 101796690 B1 | 11/2017 |
| WO | WO2020259352 A1 | 12/2020 |

OTHER PUBLICATIONS

Hertz, "How to Implement Caching Layers in Web3 Products", Sep. 22, 2022, productcoalition.com, https://productcoalition.com/how-to-implement-caching-layers-in-web3-products-feca245bc5c6, 6 pages.

Wang et al., "Decentralized Caching for Content Delivery Based on blockchain: A Game Theoretic Perspective", Jan. 23, 2018, arxiv. org, https://arxiv.org/pdf/1801.07604.pdf, 6 pages.

Basu et al., "Adaptive TTL-Based Caching for Content Delivery", Dec. 9, 2017, arxiv.org, https://arxiv.org/pdf/1704.04448.pdf, 27 pages.

Cecchet, "Encyclopedia of Database Systems", 2009, Springer, 212 pages.

Porru et al., "Blockchain-Oriented Software Engineering: Challenges and New Directions," IEEE—2017 IEEE/ACM 39th International Conference on Software Engineering Companion (ICSE-C), May 20-28, 2017, pp. 1-4.

* cited by examiner

SYSTEMS AND METHODS FOR CREATING A CONSISTENT BLOCKCHAIN INCLUDING BLOCK COMMITMENT DETERMINATIONS

CROSS-REFERENCE TO RELATED APPLICATIONS

N/A

TECHNICAL FIELD

This disclosure pertains to blockchain technology, and more particularly, but not by way of limitation, to systems and methods for creating consistent view of blockchain data that includes block commitment level determinations.

SUMMARY

According to some embodiments, the present disclosure is directed to a method comprising receiving a request for blockchain data from a user or an application; receiving proposed canonical heads from a plurality of blockchain nodes; determining a correct state for a consistent representation of the blockchain that comprises a canonical head, the canonical head having been selected from the proposed canonical heads, and the blockchain data being included in the consistent view of the blockchain; determining a commitment level for at least one block in the consistent view of the blockchain; and providing the consistent view of the blockchain to the application in such a way that the commitment level for at least one block is available to the application.

According to some embodiments, the present disclosure is directed to a system comprising a processor and a memory for storing instructions, the instructions being executed by the processor to: receive proposed canonical heads from a plurality of blockchain nodes to determine a correct state for a consistent representation of a blockchain that comprises a canonical head, the canonical head selected from the proposed canonical heads; determine a commitment level for a block in the consistent representation of the blockchain; and provide the consistent view of the blockchain to the decentralized application with the commitment level for the block.

According to some embodiments, the present disclosure is directed to a method comprising: randomly selecting block proposers; receiving a proposed canonical head from each of the block proposers; receiving an indication from attestors as to validity of each of the proposed canonical heads, the attestors being a subset of the plurality of blockchain nodes; receiving a vote from each of the attestors as to whether to add valid proposed canonical heads to a consistent representation of a blockchain; determining a commitment level for each block added to the consistent representation of the blockchain, each block being tagged with the commitment level as metadata, the commitment level being selected from at least one of the following: safe state; finalized state; latest state; earliest state; and pending state; and providing the consistent view of the blockchain with the commitment level tagging to a requester.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Overview

Figure 1:
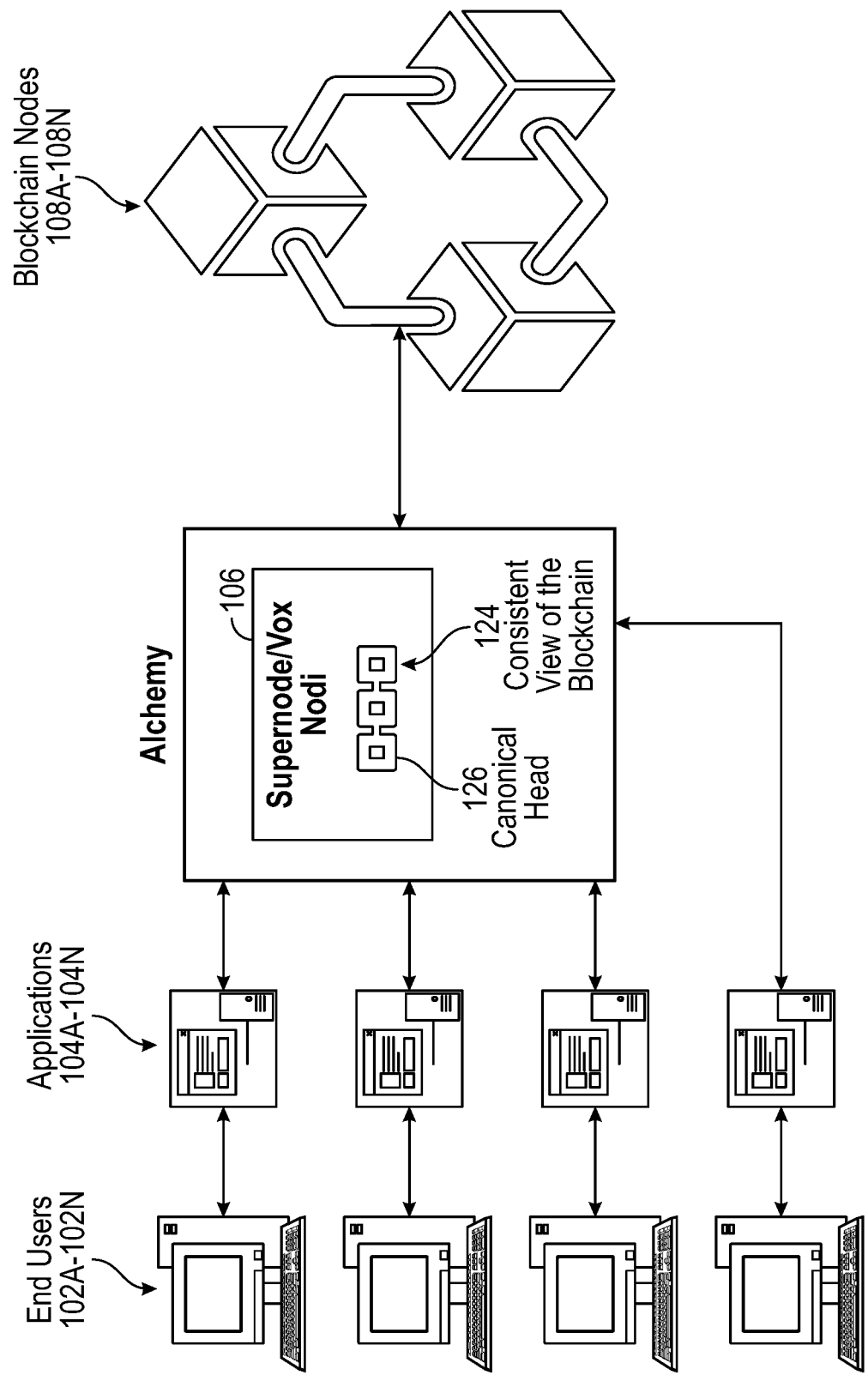
FIG. 1 is an example environment where aspects of the present disclosure can be implemented for use.

For context, blockchains are run by nodes that communicate in a peer-to-peer manner to enable decentralization. Instead of relying on a central intermediary, thousands of nodes record transactions by trustlessly propagating information to each other. As a result, using an individual node as infrastructure leads to an inaccurate view of the blockchain data.

Specifically, when a person interacts with a decentralized application that is reliant on individual nodes to serve data, the nodes do not always serve the same data, and/or the user may not always receive the data they expect. That is, an incorrect response will be received. To serve users correct and consistent results, the network of nodes has to agree about the most recent state of the blockchain. This is extremely challenging in a peer-to-peer network because information may not reach each node at the same time.

More often than not, when users receive unexpected or conflicting information, it is because there is a lack of accuracy among the nodes they are using or that are used by the application with which they're interacting. As used throughout, the term "accuracy" will be understood to include the state of data or information when a person interacts with a decentralized application and receives correct and consistent data in return.

Centralized systems make accuracy an easy problem to solve, because information can only come from one source. However, a decentralized system causes myriad new and complicated issues, including: complex implementation; challenges ensuring that information gets to the furthest participants in the network (it literally takes longer for information to reach nodes further away in a network); and/or challenges with network coordination.

All of these challenges, which can create a lack of accuracy among a group of nodes, can lead to broken user experiences, losing customers, and losing time and money by having to retroactively fix the problem.

Running a single node is also not an effective solution. Running traffic through a single node will drastically inhibit an application's scalability and reliability. For example, with respect to scalability, if the application has 100 users today, but usage demands it scales 10×, one node will not effectively manage the increased request load. With respect to reliability, if an application is dependent on one node, then when that node goes down, the application will go down, too. Due to the notorious unreliability of nodes, with just one node, much less uptime will be available than what is required. The time required for node maintenance is time that is not being efficiently spent on building products and experiences for customers.

Load balancing is also not an acceptable solution as a horizontal scaling mechanism. Load balancing directs an application's traffic to a node with the shortest line. Because requests are being routed through a single node, that node may not have the latest information, and the results are often incorrect. Users will be served conflicting results that are impossible to decipher. Load balancing creates more scalability and reliability than a single node can maintain, but it comes at the expense of accuracy.

When traffic is routed through a load balancer, nodes may have different information about the latest blocks, most recent transactions, pending transactions, and the like. These problems can mean that developers receive inconsistent blockchain data; requests fail, applications fail, or a single user will see conflicting results for the same request; and multiple users will see conflicting results for the same request. In sum, at a given moment in time, the information from an individual node, which is where information always comes from when using a load balancer, cannot be depended on.

In stark contrast, the systems and methods disclosed herein provide an explicit consistency layer, referred to as a supernode, that helps to ensure that any blockchain request being served will return a consistent result. The supernode works by running a consensus algorithm across a network of blockchain nodes, where each piece of the infrastructure can vote on the correct state of the blockchain.

By correctly routing and adjusting queries, a system of the present disclosure ensures that despite various nodes having different views of transaction data at any given time, the results are consistently accurate. This guarantees that any request to a supernode API is returned quickly, reliably, and with consistent data. The supernode enables developers to scale infinitely and reliably, because rather than an individual node, there is a broader set of nodes that are queried in order to respond to each request.

By way of example, suppose that the supernode has determined that the canonical head block is currently 0x100. The following request is then received:
{
  "jsonrpc": "2.0",
  "id": 0,
  "method": "eth_getBlockByNumber",
  "params": ["latest", false]
}

That is, the request is asking for details about the most recent block. When choosing a node to send this to, the supernode picks out a node which knows about block 0x100. However, even after a node has been selected, the request not sent as-is, because while the node knows about block 0x100, it may actually be on a later block, say 0x101, and if the original request were to be sent to that node, it would return information about block 0x101 which is inconsistent with the view that should be presented, namely that the latest block is 0x100.

In some embodiments, the node is tweaked or altered as follows:
{
  "jsonrpc": "2.0",
  "id": 0,
  "method": "eth_getBlockByNumber",
  "params": ["0x100", false]
}

The request specifically asks the node about block 0x100 instead of passing along the user's request for latest block.

In some embodiments, the supernode is used to create a consistent representation of the blockchain using block commitment determinations. In some embodiments, a supernode is configured to mediate requests for blockchain data/objects such as NFTs (non-fungible tokens), smart contracts, or any data that can be stored in a blockchain. The supernode provides optimized reliability, data correctness, and scalability.

The supernode ensures data is reliably correct, real-time, and in synchronization due to a proprietary coordinator service. The supernode powers each piece of node functionality with a dedicated, decentralized system. The supernode also scales quickly and seamlessly and includes enhanced API (application programming interface) methods and upgraded WebSockets to continuously listen for changes and automatically handle reconnection and backfilling missed events. The supernode also provides a one-line infrastructure API that not only handles all the jobs of a single node, but also possesses the uptime, availability, and reliability to run a production application.

In some embodiments, the supernode can release a new canonical head shortly after that head is discovered by nodes in order to provide information about new blocks as quickly as possible. The time between blocks varies between chains. On ETH mainnet, a block is released approximately every 14 seconds, while other chains like Solana average a block every 400 milliseconds.

With respect to how blocks are identified by nodes, on all chains, after nodes hear about a new block, this new block can usually be added to the canonical chain within approximately half a second.

In some embodiments, the supernode is configured to provide a consistent view of the canonical blockchain that can be accessed by endpoints such as decentralized applications or other similar recipients or requestors of blockchain data. It will be understood that a consistent view can include any representation of the underlying blockchain. For example, the consistent view could include a copy of block data, a read-only or viewable version of the blockchain, or any other version of the underlying blockchain that can be used by a requester who wants blockchain data. In some examples, the supernode polls blockchain nodes that are processing blockchain data and requests that these nodes vote for a canonical head that is a latest block to be proposed on a blockchain.

It will be understood that each node may have different compute capabilities, thus the current or latest block known to each node may vary. Some nodes may agree on the current or latest block, while some may propose blocks that are older or otherwise different. The supernode can receive proposed canonical heads or votes from the nodes and select a canonical head that will be used in a consistent representation of the blockchain. The consistent view of the blockchain exposed to the decentralized application(s) is dependable due to this consensus voting.

In addition to providing a consistent view of the blockchain, the supernode can further optimize what is exposed to the decentralized application(s) by ensuring that one or more blocks in the consistent view of the blockchain are evaluated and assigned a commitment designation or level. These commitment designations offer developers certain guarantees with regards to how likely the blocks are to be reorganized. These and other advantages of the present disclosure will be discussed herein with respect to the collective drawings.

EXAMPLE EMBODIMENTS

Referring now to FIG. 1, which illustrates an example architecture where aspects of the present disclosure are implemented. The architecture comprises a plurality of end user systems 102A-102N, a plurality of applications 104A-104N, a supernode 106, and a plurality of blockchain nodes 108A-108N. The elements of the architecture can communicatively couple with one another over a network or a plurality of networks, as would be known to one of ordinary skill in the art with the present disclosure before them. For example, the network may include any one or a combination of multiple different types of networks, such as cable networks, the Internet, wireless networks, and other private and/or public networks. In some instances, the network may include cellular, Wi-Fi, or Wi-Fi direct. Any suitable network may be used herein.

The end user systems 102A-102N can include any suitable computing device for any user that desires to obtain blockchain data. While the example architecture illustrates access to the blockchain data through one or more decentralized applications, the end user systems 102A-102N may also be allowed to request blockchain data directly from the supernode 106, if desired. That is, the supernode architecture can include an application development environment that can be used to create and access applications by an end user computing device.

The applications 104A-104N can include decentralized application, and may be referred to herein as such. However, this disclosure is not limited to use with decentralized application. The applications or other end points can access the supernode through a gateway or application programming interface.

The supernode 106 can service any application developed using cryptocurrency and smart contracts, which are deployed on a blockchain network. These applications can be used to read/write blockchain data, mint/access/transfer NFTs, or any other desired service related to blockchain data. In general, the applications 104A-104N receive requests from the end user systems 102A-102N and receive responses from the supernode 106.

Very broadly, the supernode 106 can receive a request from the applications 104A-104N and provide the applications 104A-104N with a consistent representation of the blockchain 124 (consistent blockchain view) in response to the request. The consistent view of the blockchain has a canonical head 126 that is determined from a consensus approach executed by the supernode 106, as will be discussed in greater detail infra. The blockchain is built over time by successively adding canonical heads to the blockchain. Each of the new canonical heads is determined through consensus, ensuring that the entire canonical head is consistent.

In general, the supernode 106 obtains blockchain data from the plurality of blockchain nodes 108A-108N, and allows one or more of the plurality of blockchain nodes 108A-108N to vote for the canonical head (e.g., the newest block to be added to the consistent view of the blockchain). The supernode 106 is also capable of determining commitment levels for blocks in the consistent view of the blockchain.

Figure 2:
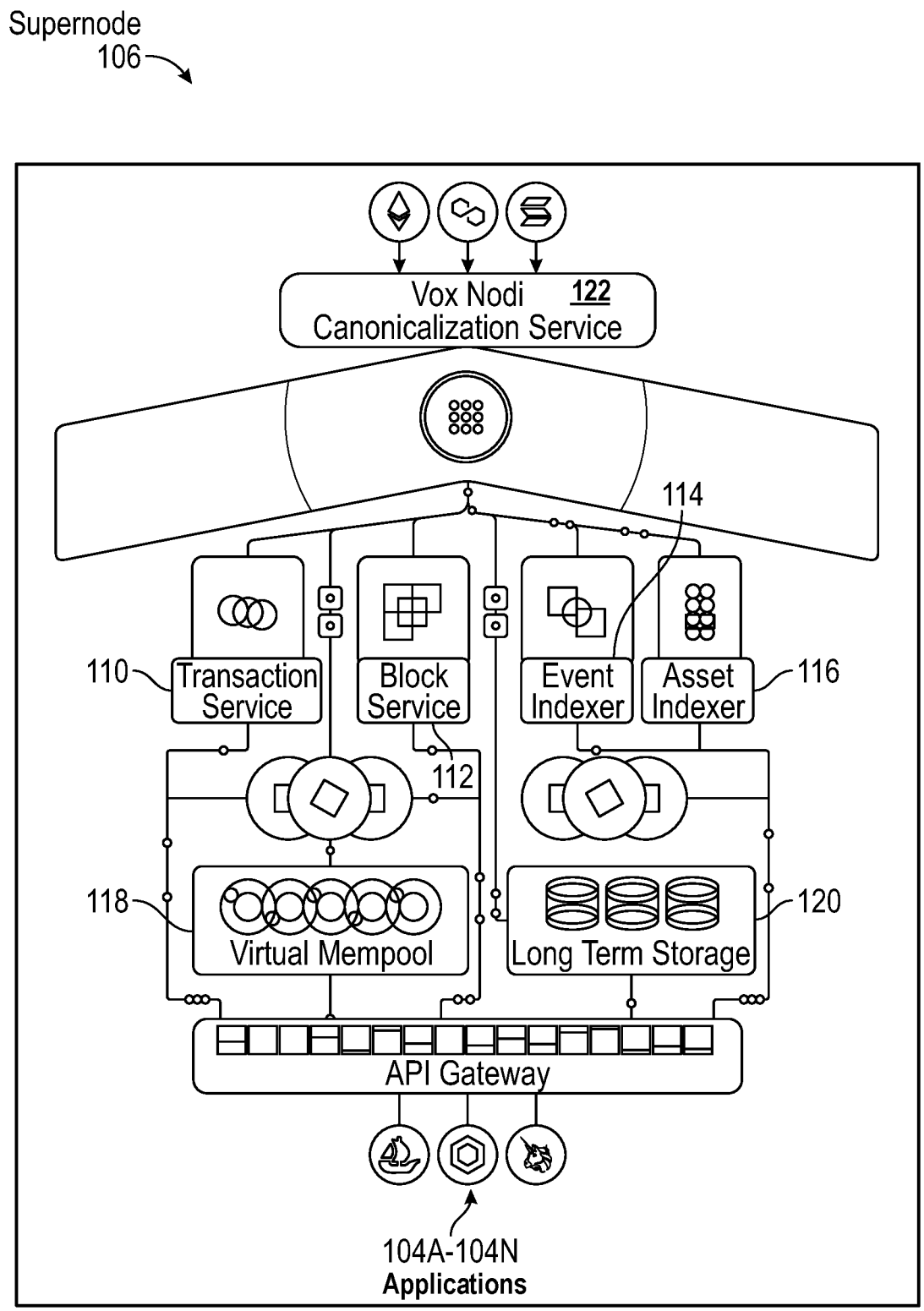
FIG. 2 is a schematic illustration of a "supernode" of the present disclosure.

Referring now to FIG. 2, the supernode 106 is schematically illustrated as comprising a transaction service 110, a block service 112, an event indexer 114, an asset indexer 116, a virtual mempool 118, long-term storage 120, and a canonicalization service 122.

The transaction service 110 processes transaction-related data obtained from the blockchain. For example, a transaction could include the creation, modification, transfer, or other use of an NFT. The block service 112 can be used to detect and analyze blockchain blocks, again for the purposes of obtaining and analyzing block-related metadata. The event indexer 114 can be used to index events related to the blockchain or a block. Events can include blockchain object creation, modification, ownership transfers, and so forth.

The asset indexer 116 can be used to identify and index data related to assets such as digital currency, NFTs, smart contracts, or other similar assets that can be created and/or transferred through means of the blockchain. The virtual mempool 118 is a collection of pending transactions waiting for validation from a node before they are committed to a new block on the blockchain. The mempool is a staging area for unconfirmed transactions in a node. Every blockchain node in the network has a mempool, and they all intercommunicate to share information about the latest pending transactions. The long-term storage 120 can be used to store any data that is desired.

The canonicalization service 122 can be used to create a consistent view of the blockchain for the applications 104A-104N. The canonicalization service 122 can create a consistent view of the blockchain by first receiving proposed canonical heads from the plurality of blockchain nodes. The canonicalization service 122 can receive votes to determine a correct state for a consistent view of the blockchain that comprises a canonical head.

In some embodiments, the canonicalization service 122 can monitor the state and responsiveness of each of the plurality of blockchain nodes 108A-108N and determine if the proposed canonical head should be considered or excluded. For example, if a node offers old or outdated canonical heads, the canonicalization service 122 may exclude the node for a period of time. The excluded node can offer proposed canonical heads after a threshold period of time, such as a selectable number of minutes, hours, days, or other time period. The canonicalization service 122 can select this period of time automatically. Alternatively, an administrator can also set the threshold period of time.

Figure 3:
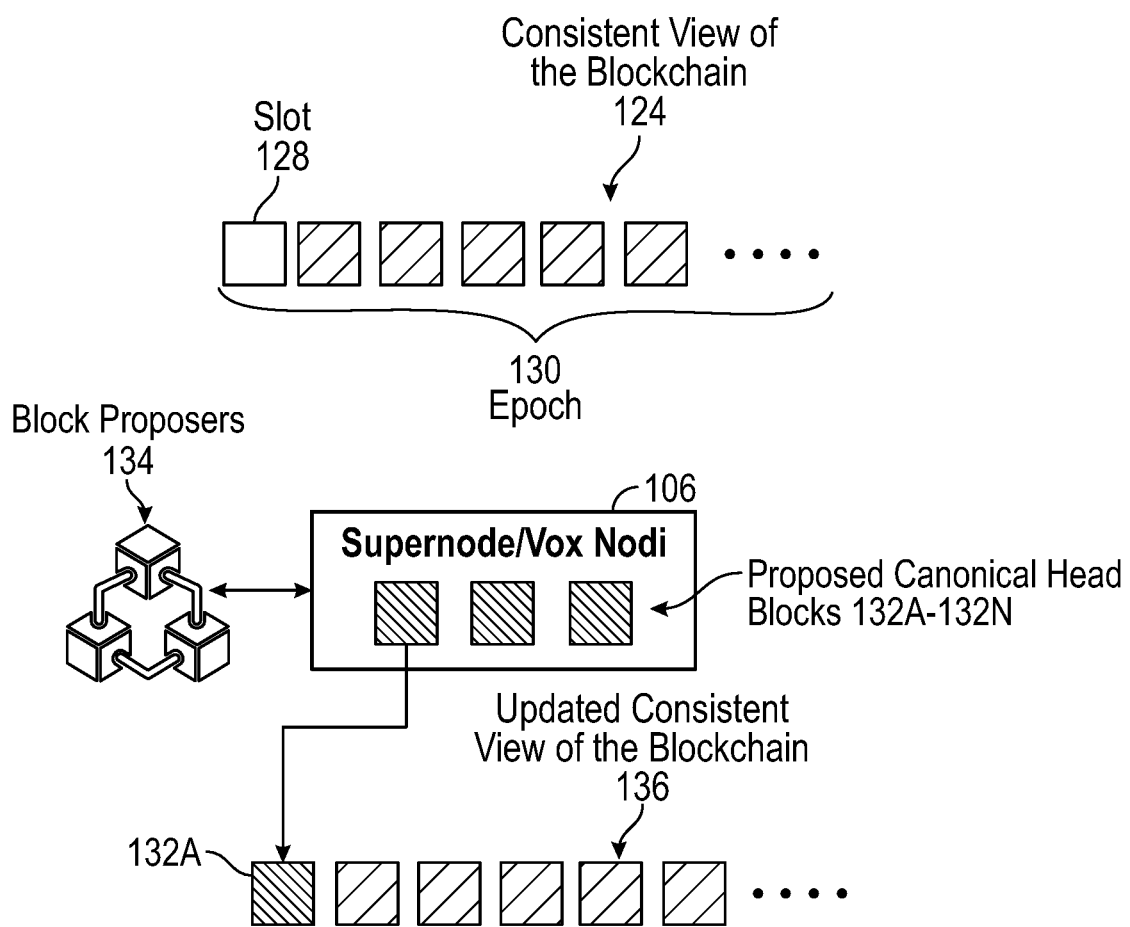
FIG. 3 schematically illustrates an example process for updating a consistent view of blockchain data with a new canonical head.

Referring now to FIG. 3, for context, blocks can be added to a consistent view of the blockchain 124 according to slots and epochs. A slot 128 is an opportunity for a block to be added to the chain. In some instances, slots occur approximately every twelve seconds. An epoch 130 is thirty-two slots, which occurs approximately every six minutes. As proposed canonical head blocks 132A-132N are received from the block proposers 134 (a group of nodes selected from the blockchain network), the supernode 106 can select one of the proposed canonical head blocks, such as block 132A to add to the consistent blockchain to create an updated consistent view 136 of the blockchain. Methods for selecting the appropriate proposed canonical head are disclosed in greater detail herein.

In more detail, some of the blockchain nodes in the plurality of blockchain nodes 108A-108N are referred to as validator nodes. A validator is a participant in proof of stake consensus. In some instances, validators need to submit a security deposit in order to get included in the validator set. Proof of stake can include a method by which a cryptocurrency blockchain protocol aims to achieve decentralized consensus. The proof of stake asks users to prove ownership of a certain amount of cryptocurrency (their "stake" in the network) in order to be able to participate in the validation of transactions. A security deposit could be a quantity of Ether (i.e., the token associated with the Ethereum blockchain protocol) or other cryptocurrency or token that a user deposits into a mechanism (often a proof of stake consensus mechanism, though this can also be used for other applications) that a user expects to be able to eventually withdraw and recover, but which can be taken away in the event of user malfeasance.

In some instances, validators are randomly selected by the canonicalization service 122 for every slot to propose a block during a proof of stake. Again, each block that is added to the chain is essentially a new canonical head.

These validators may also be known as block proposers. If the validator does not propose a block in their slot (e.g., if the validator is offline) the canonicalization service 122 can place an empty slot in that position and move on to the next one. Otherwise, if the block is created, a randomly chosen committee of validators (attesters) will first verify that new block is valid then submit a vote (attestation) that the block is valid to the network.

In some embodiments, all or a subset of the plurality of blockchain nodes 108A-108N can suggest a block as the canonical head for the blockchain. The canonicalization service 122 can receive these votes and determine the canonical head using any specified methodology disclosed herein. For example, the canonical head can be selected based on an aggregate number of votes, or the largest number of nodes offering the same block as the new canonical head. As noted, the canonicalization service 122 can ignore votes from nodes that have latency issues or other deleterious behaviors. That is, while latency or "slowness" is one factor that can be used to exclude a node from voting (or allow the canonicalization service 122 to ignore the vote), other node behaviors can also be used. Further, it will be understood that voting can include the offering of a block as a proposed canonical head.

Once the canonical head has been chosen, this creates a correct state for the consistent view of the blockchain. This view of the blockchain is considered to be consistent because it is made from a series of canonical head blocks that were obtained through a consensus approach. The canonicalization service 122 can assemble and expose the consistent view of the blockchain to any of the decentralized applications requesting blockchain data.

The process for identifying the canonical head can include identifying and excluding uncle blocks. Uncle blocks occur when nodes on a network do not immediately accept a block into the blockchain. As a result, another node can build and propagate their block at a similar time. To confirm the legitimacy of constructed blocks, they must be broadcast throughout the network to all nodes, which may cause latency issues. These types of blocks can be excluded from consideration as the canonical head.

Additionally, the canonicalization service 122 can determine block commitment levels for blocks included in the blockchain. General definitions for commitment levels are as follows: safe; finalized; latest; earliest; and pending. The commitment levels can be appended to the blocks as tags/metadata.

One example commitment level is safe, which refers to a block that is the most recent crypto-economically secure block. This level of block cannot be re-organized outside of manual intervention driven by community coordination. Intuitively, this block is "unlikely" to be re-organized. It will be understood that re-organization is an event where a block that was included in the canonical chain (longest chain) is removed from the canonical chain in favor of another block with the same height. It can occur when more than one miner or validator proposes a block at the same time.

One example commitment level is finalized, which refers to a block that is the most recent crypto-economically secure block, which has been accepted by a predetermined number of validators. For example, a block may be tagged as finalized when accepted by two-thirds of validator nodes. These block types are typically finalized in two epochs and cannot be re-organized outside of manual intervention driven by community coordination. Intuitively, this block is very unlikely to be re-organized.

One example commitment level is latest, which refers to a block that is the most recent block in the canonical chain observed by a client. This type of block may be re-organized out of the canonical chain even under healthy/normal conditions. Intuitively, this block is the most recent block observed by a client.

One example commitment level is earliest, which refers to a block that is the lowest numbered block the client has available. Intuitively, this type of block can be thought of as the first block created.

One example commitment level is pending, which refers to a block that is a sample next block built by a client on top of the latest block. This type of block may contain a set of transactions usually taken from a local mempool. Intuitively, these blocks have not been mined yet. Generally speaking, differences between block tags can be considered in order of oldest to newest block numbers: earliest≤finalized≤safe≤latest≤pending.

It will be understood that both safe and finalized levels define commitment levels for block finality. Unlike the latest level which looks at increments of one block at a time (for example: 101, 102, 103), the safe and finalized level look at increments every "epoch" (32 blocks), which is approximately every six minutes assuming an approximate average of twelve second block times.

Thus, in sum, the canonicalization service 122 can determine a commitment level for at least one block in the consistent blockchain. In some instances, all blocks in the consistent chain can be assigned a commitment level. Once the consistent blockchain has been created by the canonicalization service 122, the consistent blockchain can be made available to a requesting decentralized application. The consistent blockchain and commitment level data are exposed or otherwise made available.

In some embodiments, the canonicalization service 122 can select a subset of the plurality of blockchain nodes 108A-108N to service a request from a user or decentralized application. In some instances, the canonicalization service 122 creates a random assignment of nodes for a request. The canonicalization service 122 can also select the subset for each of a plurality of requests such that each subset overlaps to only a minor degree. Thus, if various nodes in the plurality of blockchain nodes 108A-108N are unavailable, this will ensure that most user requests remain serviceable with the plurality of blockchain nodes 108A-108N that are available.

Figure 4:
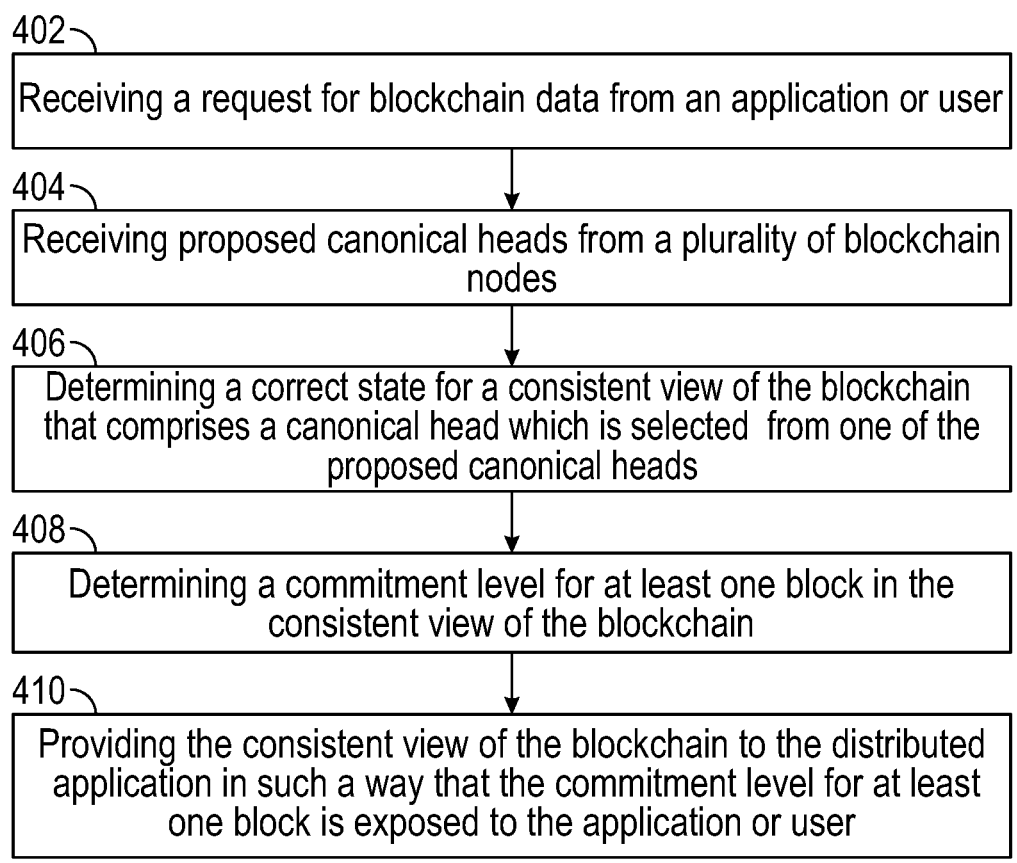
FIG. 4 is a flowchart of an example method of the present disclosure pertaining to creating a consistent view of blockchain data.

FIG. 4 is a flowchart of an example method of the present disclosure. The method can include a step 402 of receiving a request for blockchain data from a decentralized application. This can include a decentralized application requesting any type of blockchain data. The supernode receives this request and then attempts to obtain the requested data from blockchain nodes. As noted above, this can include a request for transaction data, a request pertaining to an NFT, a cryptocurrency transaction, or any other blockchain objects or data that can be obtained from nodes of a blockchain network.

Next, the method can include a step 404 of receiving proposed canonical heads from a plurality of blockchain nodes. These nodes may be referred to as block proposers in some instances. Each of the nodes can offer a block as their proposed canonical head.

Once the proposed heads have been received, the method can include a step 406 of determining a correct state for a consistent view of the blockchain that comprises a canonical head that is selected from one of the proposed canonical heads. The canonical head is selected from one of the proposed canonical heads. Also, it will be understood that the blockchain data requested will be included in the consistent view of the blockchain. The correct state can be determined using both block validation and voting processes, which are described throughout this disclosure (see FIG. 5 for an example method). Once a canonical head has been selected and the consistent blockchain created, the method can include a step 408 of determining a commitment level for at least one block in the consistent view of the blockchain. To be sure, in some instances, each block in the consistent view of the blockchain can be analyzed and assigned a commitment level. In some instances, the canonical head is analyzed and assigned a commitment level. The supernode can tag a block with metadata pertaining to the commitment level.

As noted above, the commitment level can include a latest state that indicates that the at least one block is a most recent block chosen by randomly selected validators. Alternatively, the commitment level can include a safe state that indicates that the at least one block has received votes from a threshold number of the validators. In another example, the commitment level can include a finalized state that indicates that the at least one block is a safe block that is at least one epoch behind a most recently safe block. In yet another example, the commitment level can include a finalized state a pending state that indicates that the at least one block is a lowest numbered block that is available. In some embodiments, the commitment level can include a pending state that indicates that the at least one block is a sample next block built on top of a latest block.

In some embodiments, the method can include a step 410 of providing the consistent view of the blockchain to the decentralized application in such a way that the commitment level for the at least one block is exposed to the decentralized application. A decentralized application can then use the consistent blockchain to obtain the data that was requested. The data has been augmented to include the commitment level(s) for one or more blocks. Thus, not only has the blockchain been processed for consistency, but blocks are also tagged with commitment level(s) which inform the decentralized application as to the state of the block(s).

Figure 5:
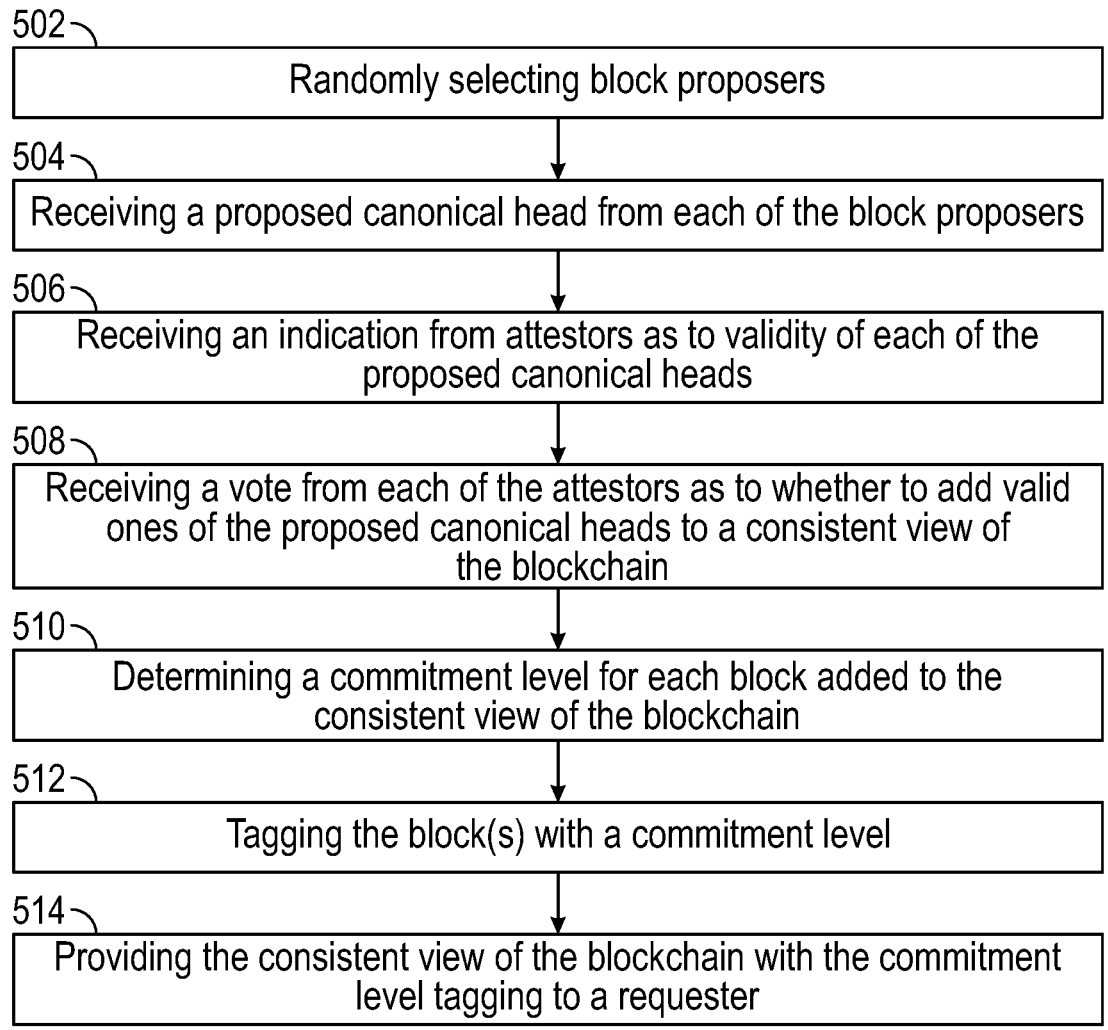
FIG. 5 is a flowchart of an example method of the present disclosure pertaining to receiving a validated and voted-upon canonical head for a consistent view of blockchain data.

FIG. 5 is a flowchart of another example method of the present disclosure. This method relates to forming consensus from blockchain nodes to create a consistent view of the blockchain. The method can include a step 502 of randomly selecting block proposers. These block proposers are a subset of the blockchain nodes in a network. A supernode can select these block proposers at random or based on other criteria established by a system administrator or heuristic learning algorithm. For example, the supernode can learn which nodes are the most reliable or accurate and choose these nodes as block proposers.

In some embodiments, the method includes a step 504 of receiving a proposed canonical head from each of the block proposers. For example, each of the block proposers can offer a block as a proposed canonical head. When the proposed canonical head blocks have been received from the block proposers, another set of blockchain nodes, referred to as attestors can be chosen to determine validity of the proposed canonical head blocks. Additionally, each of the attestors can vote for which of the proposed canonical head blocks should be adopted as the final canonical head.

Thus, the method can include a step 506 of receiving an indication from attestors as to the validity of each of the proposed canonical heads, as well as to a step 508 of receiving a vote from each of the attestors as to whether to add one or more valid proposed canonical heads to a consistent view of the blockchain. This validation process ensures that one of the valid proposed canonical head blocks can receive a vote.

The supernode can receive the votes and select the final canonical head. In one example calculation, the supernode can use a quorum (e.g., two thirds) number of votes. However, any threshold number of votes can be used as the basis for selecting the final canonical head. It will be understood that this process for selecting, voting, and adopting a new canonical head for a consistent view of the blockchain can occur periodically, or on an ad-hoc, as-needed basis.

In one embodiment, the method includes a step 510 of determining a commitment level for each block added to the consistent view of the blockchain. These commitment levels generally pertain to how likely a block is to change or be replaced. The levels or states for a block can include safe state; finalized state; latest state; earliest state; and pending state, each of which are described in greater detail supra. In some embodiments, the method includes a step 512 of tagging the block(s) with a commitment level. Finally, in step 514 the method includes providing the consistent view of the blockchain with the commitment level tagging to a requester. In this example, the requester is any user of the supernode, which could include a decentralized application.

Figure 6:
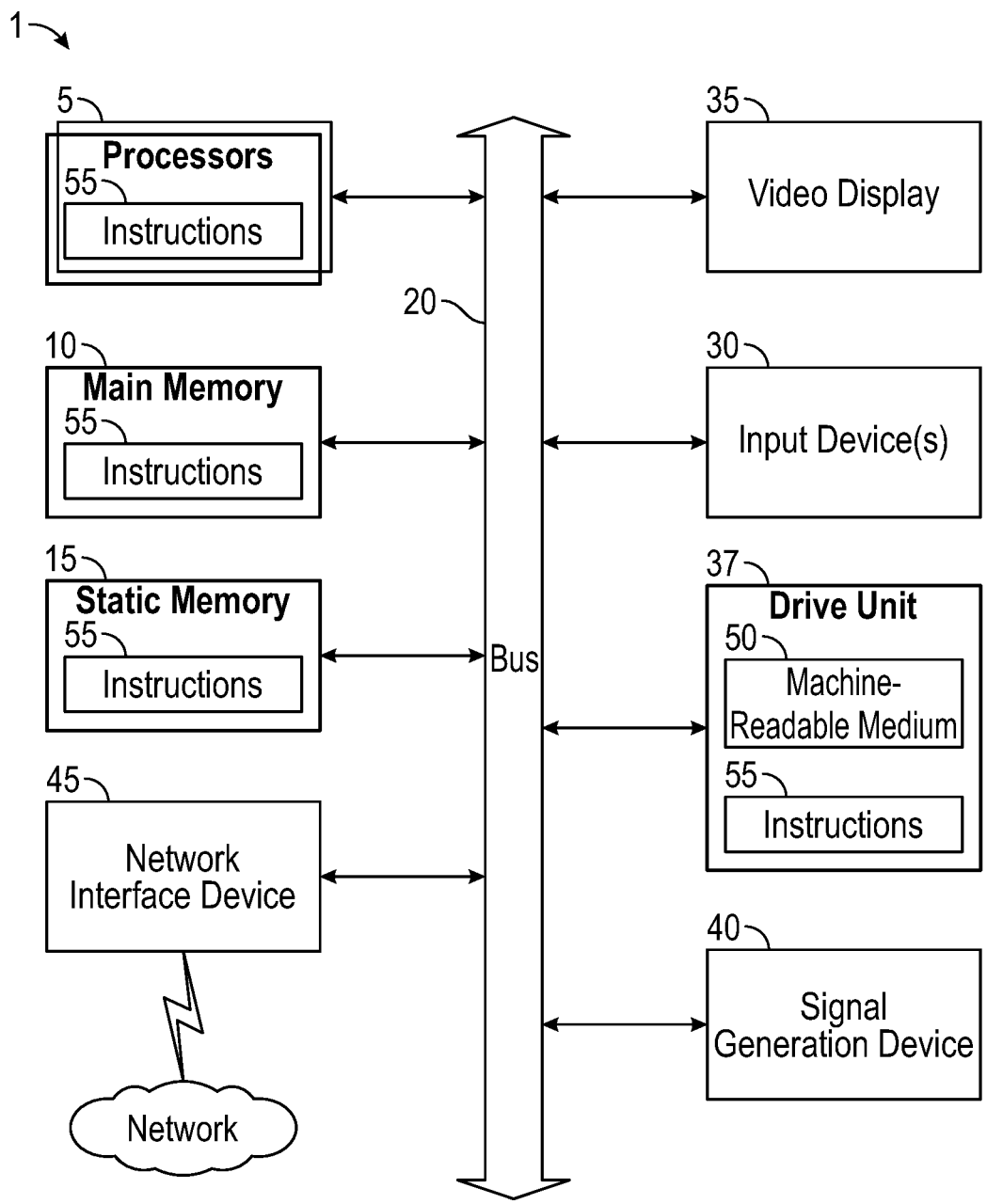
FIG. 6 is a simplified block diagram of a computing system, in accordance with some embodiments.

FIG. 6 is a diagrammatic view of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method comprising:
   receiving, by a supernode, a request for blockchain data from an end user system or a decentralized application;
   receiving proposed canonical heads from a plurality of blockchain nodes;
   determining a correct state for a consistent view of a blockchain that comprises a canonical head, the canonical head being selected from the proposed canonical heads, the blockchain data being included in the consistent view of the blockchain;
   determining a commitment level for at least one block in the consistent view of the blockchain, the commitment level including a safe state indicating that the at least one block has received votes from a threshold number of validators; and
   providing a consistent view of the blockchain to the end user system or the decentralized application in such a way that the commitment level for the at least one block is available to the end user system or the decentralized application.

2. The method according to claim 1, wherein the commitment level includes a latest state that indicates that the at least one block is a most recent block chosen by randomly selected validators.

3. The method according to claim 1, wherein the commitment level includes a finalized state that indicates that the at least one block is a safe block that is at least one epoch behind a most recently safe block.

4. The method according to claim 3, wherein the commitment level includes a pending state that indicates that the at least one block is a lowest numbered block that is available.

5. The method according to claim 4, wherein the commitment level includes a pending state that indicates that the at least one block is a sample next block built on top of a latest block.

6. The method according to claim 1, further comprising tagging the at least one block with the commitment level as metadata.

7. The method according to claim 1, wherein determining the correct state includes:
   randomly selecting block proposers from the plurality of blockchain nodes; and
   receiving one of the proposed canonical heads from each of the block proposers.

8. The method according to claim 7, further comprising receiving a vote from each of attestors as to whether to add valid ones of the proposed canonical heads to the consistent view of the blockchain.

9. A supernode system, comprising:
   a processor; and
   a memory for storing instructions, the instructions being executed by the processor to:
   receive proposed canonical heads from a plurality of blockchain nodes;
   determine a correct state for a consistent view of a blockchain that comprises a canonical head, the canonical head being selected from the proposed canonical heads;
   determine a commitment level for a block in the consistent view of the blockchain, the commitment level including a safe state indicating that at least one block has received votes from a threshold number of validators; and
   provide from the supernode the consistent view of the blockchain to an end user system or a decentralized application, along with the commitment level for the block.

10. The system according to claim 9, wherein the processor tags the commitment level to the block as metadata.

11. The system according to claim 10, wherein the commitment level includes a latest state that indicates that the block is a most recent block chosen by validators.

12. The system according to claim 9, wherein the commitment level includes a finalized state that indicates that the block is a safe block that is at least one epoch behind a most recently safe block.

13. The system according to claim 12, wherein the commitment level includes a pending state that indicates that the block is a lowest numbered block that is available.

14. The system according to claim 13, wherein the commitment level includes a pending state that indicates that the block is a sample next block built by a client on top of a latest block.

15. The system according to claim 14, wherein the processor is configured to:

randomly select block proposers from the plurality of blockchain nodes; and receive one of the proposed canonical heads from each of the block proposers.

16. The system according to claim 15, wherein the processor is configured to receive an indication from attestors as to validity of each of the proposed canonical heads, the attestors being a subset of the plurality of blockchain nodes.

17. The system according to claim 16, wherein the processor is configured to receive a vote from each of the attestors as to whether to add valid ones of the proposed canonical heads to the consistent view of the blockchain.

18. The system according to claim 17, wherein the processor is configured to create an empty slot in the consistent view of the blockchain when one of the block proposers fails to provide a proposed canonical head.

19. A method, comprising:
randomly selecting block proposers;
receiving a proposed canonical head from each of the block proposers;
receiving an indication from attestors as to validity of each of the proposed canonical heads, the attestors being a subset of a plurality of blockchain nodes;
receiving a vote from each of the attestors as to whether to add valid ones of the proposed canonical heads to a consistent view of a blockchain;
determining a commitment level for each block added to the consistent view of the blockchain, each block being tagged with the commitment level as metadata, the commitment level being selected from at least one of: safe state; finalized state; latest state; earliest state; and pending state, the safe state indicating that at least one block has received votes from a threshold number of validators; and
providing the consistent view of the blockchain with the commitment level tagging to a requester.

20. The method according to claim 19, wherein the latest state indicates that a block is a most recent block chosen by a validator.

21. The method according to claim 20, wherein the safe state indicates that a block has received attestations from the threshold number of validators.

22. The method according to claim 21, wherein the finalized state indicates that a block is a safe block that is at least one epoch behind a most recently safe block.

23. The method according to claim 22, wherein the pending state indicates that a block is a lowest numbered block that is available.

24. The method according to claim 23, wherein the pending state indicates that a block is a sample next block built on top of a latest block.

25. The method according to claim 19, further comprising creating an empty slot in the consistent view of the blockchain when one of the block proposers fails to provide a proposed canonical head.

26. A method comprising:
receiving, by a supernode, a request for blockchain data from an end user system or a decentralized application;
receiving proposed canonical heads from a plurality of blockchain nodes;
receiving an indication from attestors as to validity of each of the proposed canonical heads;
determining a correct state for a consistent view of a blockchain that comprises a canonical head, the canonical head being selected from the proposed canonical heads, the blockchain data being included in the consistent view of the blockchain;
determining a commitment level for at least one block in the consistent view of the blockchain; and
providing the consistent view of the blockchain to the end user system or the decentralized application in such a way that the commitment level for the at least one block is available to the end user system or the decentralized application.

27. A method comprising:
receiving, by a supernode, a request for blockchain data from an end user system or a decentralized application;
receiving proposed canonical heads from a plurality of blockchain nodes;
creating an empty slot in a consistent view of a blockchain when a block proposer fails to provide a proposed canonical head;
determining a correct state for the consistent view of the blockchain that comprises a canonical head, the canonical head being selected from the proposed canonical heads, the blockchain data being included in the consistent view of the blockchain;
determining a commitment level for at least one block in the consistent view of the blockchain; and
providing the consistent view of the blockchain to the end user system or the decentralized application in such a way that the commitment level for the at least one block is available to the end user system or the decentralized application.

28. A supernode system, comprising:
a processor; and
a memory for storing instructions, the instructions being executed by the processor to:
receive proposed canonical heads from a plurality of blockchain nodes;
receive an indication from attestors as to validity of each of the proposed canonical heads;
determine a correct state for a consistent view of a blockchain that comprises a canonical head, the canonical head being selected from the proposed canonical heads;
determine a commitment level for a block in the consistent view of the blockchain; and
provide from the supernode the consistent view of the blockchain to an end user system or a decentralized application, along with the commitment level for the block.

29. A supernode system, comprising:
a processor; and
a memory for storing instructions, the instructions being executed by the processor to:
receive proposed canonical heads from a plurality of blockchain nodes;
create an empty slot in a consistent view of a blockchain when a block proposer fails to provide a proposed canonical head;
determine a correct state for the consistent view of the blockchain that comprises a canonical head, the canonical head being selected from the proposed canonical heads;
determine a commitment level for a block in the consistent view of the blockchain; and
provide from the supernode the consistent view of the blockchain to an end user system or a decentralized application, along with the commitment level for the block.

30. A method, comprising:
randomly selecting block proposers;

receiving a proposed canonical head from each of the block proposers;

creating an empty slot in a consistent view of a blockchain when a block proposer fails to provide a proposed canonical head;

receiving an indication from attestors as to validity of each of proposed canonical heads, the attestors being a subset of a plurality of blockchain nodes;

receiving a vote from each of the attestors as to whether to add valid ones of the proposed canonical heads to the consistent view of the blockchain;

determining a commitment level for each block added to the consistent view of the blockchain, each block being tagged with the commitment level as metadata, the commitment level being selected from at least one of: safe state; finalized state; latest state; earliest state; and pending state; and providing the consistent view of the blockchain with the commitment level tagging to a requester.

* * * * *